United States Patent [19]
Aziz

[11] Patent Number: 5,668,877
[45] Date of Patent: Sep. 16, 1997

[54] METHOD AND APPARATUS FOR STEPPING PAIR KEYS IN A KEY-MANAGEMENT SCHEME

[75] Inventor: Ashar Aziz, Fremont, Calif.

[73] Assignee: Sun Microsystems, Inc., Palo Alto, Calif.

[21] Appl. No.: 348,725

[22] Filed: Dec. 2, 1994

Related U.S. Application Data

[63] Continuation-in-part of Ser. No. 258,272, Jun. 10, 1994, Pat. No. 5,588,060, and a continuation-in-part of Ser. No. 258,344, Jun. 10, 1994, Pat. No. 5,416,842.

[51] Int. Cl.$^6$ .................................................... H04L 9/30
[52] U.S. Cl. ......................................... 380/30; 380/21
[58] Field of Search ................................ 380/21, 23, 30

[56] References Cited

U.S. PATENT DOCUMENTS

| | | | |
|---|---|---|---|
| 5,124,117 | 6/1992 | Tatebayashi et al. | 380/30 |
| 5,148,479 | 9/1992 | Bird et al. | 380/23 |
| 5,241,599 | 8/1993 | Bellovin et al. | 380/30 |
| 5,307,410 | 8/1994 | Bennett | 380/21 |
| 5,313,521 | 5/1994 | Torii et al. | 380/21 |
| 5,347,580 | 9/1994 | Canetti et al. | 380/30 |
| 5,416,842 | 5/1995 | Aziz | 380/30 |
| 5,515,438 | 5/1996 | Bennett et al. | 380/21 |
| 5,544,246 | 8/1996 | Mandelbaum et al. | 380/23 |
| 5,548,646 | 8/1996 | Aziz et al. | 380/30 |
| 5,577,124 | 11/1996 | Anshel et al. | 380/30 |

OTHER PUBLICATIONS

Whitfield Diffie, "The First Ten Years of Public–Key Cryptography", (Proceedings of the IEEE, vol. 76, No. 5, May 1988).

Paul Fahn, "Answers to Frequently Asked Questions About Today's Cryptography", (RSA Laboratories, 1992).

"Part I: Message Encryption and Authentication Procedures", (Privacy Enhancement for Internet Electronic Mail, J. Linn (Network Working Group).

(List continued on next page.)

*Primary Examiner*—Salvatore Cangialosi
*Attorney, Agent, or Firm*—Irell & Manella LLP

[57] ABSTRACT

A method and apparatus for generating additional implicit keys from a key $[K_{ij}]_N$ without the necessity of generating a new Diffie-Helman (DH) certificate or requiring communication between nodes to change implicit master keys is disclosed. A first data processing device (node I) is coupled to a private network which is in turn coupled to the Internet. A second data processing device (node J) is coupled to the same, or to a different network, which is also coupled to the Internet, such that node I communicates with node J using the Internet protocol. Node I is provided with a secret value i and a public value. Data packets (referred to as "datagrams") are encrypted to enhance network security. Each node maintains an internal value of N which is incremented based on time and upon the receipt of a data packet from another node. The key $[K_{ij}]_{N_i}$ is derived from the appropriate quantity of $\alpha^{Nij}$ by using high order key-sized bits of the respective quantity. The present invention then utilizes the key $[K_{ij}]_{N_i}$ to encrypt a transient key which is referred to as $K_p$. Node I encrypts the IP data in $K_p$ and encrypts $K_p$ in $[K_{ij}]_{N_i}$. Node I transmits the encrypted IP datagram packet in the encrypted key $K_p$ to the receiving node J. Node I further includes its current internal value of $N_i$ in the outgoing packet. The present invention also provides for the application of one-way functions to the shared secret to enhance security. Thus, either node I or node J may change the context such that if in the future $[K_{ij}]_{N_i}$ is compromised, or is not useable by a cracker to either decrypt prior encrypted packets. The present invention discloses methods and apparatus for achieving perfect forward security for closed user groups, and for the application of the SKIP methodology to datagram multicast protocols.

40 Claims, 8 Drawing Sheets

OTHER PUBLICATIONS

"Part II: Certificate-Based Key Management", (Privacy Enhancement for Internet Electronic Mail, S.Kent (Network Working Group).

"Part III: Algorithms, Modes, and Identifiers", (Privacy Enhancement for Internet Electronic Mail), D.Balenson (Network Working Group).

"Part IV: Key Certification and Related Services" (Privacy Enhancement for Internet Electronic Mail), B. Kaliski (Network Working Group).

"Whitfield Diffie, Paul C. Van Oorschool and Michael J. Wiener, Authentication and Authenticated Key Exchanges" (Designs, Codes and Cryptography, 2–107–125 (1992), Kluwer Academic Publishers).

"The MD5 Message–Digest Algorithm", MIT Laboratory for Computer Science and RSA Data Security, Inc. (1992), R. Rivest (Network Working Group).

RSA Data Security, Inc. Technology Bulletin.

METHOD AND APPARATUS FOR STEPPING PAIR KEYS IN A KEY-MANAGEMENT SCHEME

This Application is a continuation-in-part of U.S. patent application Ser. No. 08/258,272, now U.S. Pat. No. 5,588,060 entitled "A KEY-MANAGEMENT SCHEME FOR DATAGRAM PROTOCOLS", and Ser. No. 08/258,344, now U.S. Pat. No. 5,416,842 entitled "METHOD AND APPARATUS FOR KEY-MANAGEMENT SCHEME FOR USE WITH INTERNET PROTOCOLS AT SITE FIREWALLS", both filed Jun. 10, 1994, which are incorporated fully herein by reference, assigned to the Assignee, Sun Microsystems, Inc., and referred to herein as the "parent applications".

BACKGROUND OF THE INVENTION

1. Field of the Invention:

The present invention relates to the field of key management schemes, and more particularly, the present invention relates to a key management scheme for Internet working protocols to provide additional security at the network layer.

2. Art Background:

The Internet comprises a spiderweb of connected networks which criss-cross the globe and permit users to send and receive data packets between computers. Although many of the computers coupled to the Internet are disposed at fixed locations, portable computer systems may be physically moved from one location on a network to another. Wireless links coupling the computers to the Internet, including direct satellite links, also allow users to access the Internet from remote areas. As a result of the dramatic increase in the use of the Internet throughout the word, concerns regarding network security naturally arise.

A variety of schemes have been proposed to increase security on the Internet, and a number of these schemes have been adopted. For example, encryption and authentication procedures known as Privacy Enhanced Mail (PEM) provide for enhanced privacy in electronic mail ("e-mail") services over the Internet. Additionally, schemes for utilizing PEM for secure remote user authentication have also been proposed. (See, for example, copending U.S. patent application Ser. No. 08/253,802, filed Jun. 3, 1994, entitled "METHOD AND APPARATUS FOR SECURE REMOTE USER AUTHENTICATION IN A PUBLIC NETWORK", assigned to the Assignee of this patent application, Sun Microsystems, Inc., and hereby incorporated fully by reference.)

However, even if a remote user has been authenticated, there still exists the possibility that an intruder (herein referred to as a "cracker") may mount an active attack to interject himself in data transfers across the Internet. Although a user may incorporate a scheme for secure remote user authentication prior to login, a cracker may sever one of the authenticated parties from the Internet connection, and receive and transmit substitute data packets to the other unwitting party (or potentially to both parties). Once the Internet connection is established, data packets are sent over the network in the clear. For example, a cracker may interject himself between, for example, a user "A" in communication with a user "B" on the Internet, and issue a disconnect command to user A. Upon receipt of the disconnect command from the cracker, user A believes that user B has severed the connection. The cracker may then take over the communication established with user B, such that user B does not know that user A is not sending him data packets.

Thus, a number of security issues exist when sending data over the Internet, including a cracker's ability to monitor data packets in the clear and to interject himself in the communication line such that he may receive and send data packets to unwitting users. It is, therefore, advantageous to put authenticity and privacy features at the network layer on the Internet. However, the majority of the privacy and authentication protocols which have been proposed provide session oriented key management schemes. Unfortunately, many of the commonly used network layer protocols are session-less datagram oriented protocols.

In the Applicant's co-pending parent U.S. patent applications of which this U.S. patent is a continuation-in-part, a simple key management scheme (referred to as "SKIP") was disclosed for use in session-less datagram protocols. In the SKIP scheme, a first data processing device (node I) is coupled to a private network which is in turn coupled to the Internet. A second data processing device (node J) is coupled to the same, or to a different network, which is also coupled to the Internet, such that node I communicates to node J using the Internet protocol ("IP"). Node I is provided with a secret value i, and a public value $\alpha^i$ mod p. Node J is provided with a secret value j, and a public value $\alpha^j$ mod p. Data packets (referred to as "datagrams") are encrypted using the teachings of the present invention to enhance network security. A source node I obtains a Diffie-Helman (DH) certificate for node J (either from a local cache, from a directory service, or directly from node J), and obtains node J's public value $\alpha^j$ mod p from the DH certificate. Node I then computes the value of $\alpha^{ij}$ mod p, and derives a key $K^{ij}$ from the value $\alpha^{ij}$ mod p. A transient key $K_p$ is generated at random and is used to encrypt the datagram to be sent by node I. The key $K_p$ is used for a configurable number of bytes, which is the maximum number of bytes the node will encrypt using $K_p$. The key $K_p$ is then encrypted with key $K_{ij}$.

Upon receipt of the encrypted datagram by the receiving node J, the node J obtains a DH certificate for node I (either from a local cache, from a directory service or directly from node J) and obtains the public value $\alpha^i$ mod p. Node J then computes the value of $\alpha^{ij}$ mod p and derives the key $K_{ij}$. Node J utilizes the key $K_{ij}$ to decrypt the transient key $K_p$, and using the decrypted transient key $K_p$, node J decrypts the datagram packet, thereby resulting in the original data in unencrypted form.

One aspect of the SKIP scheme disclosed in my co-pending parent application is that $K_{ij}$ stays constant until the DH certificate changes. Depending on the environment, obtaining a new DH certificate may result in system performance degradation. As will be described, the present invention discloses a method and apparatus for generating other implicit keys from $K_{ij}$, without the necessity of generating a new DH certificate or requiring any communication between node I and J to change keys. Using the teachings of the present invention, one secret may be used to generate literally millions of secret keys by stepping the context, where a context is defined by an implicit interchange key. In addition, the present invention provides methods and apparatus for achieving perfect forward secrecy in closed user groups, through the application of one-way functions to the implicit pair-wise secrets for each node. Moreover, the present invention discloses an improved application of SKIP for datagram multicasts.

SUMMARY OF THE INVENTION

The present invention provides an improved simple key management scheme (SKIP) having particular application to datagram protocols, such as the Internet protocol (IP).

In one embodiment, the present invention discloses a method and apparatus for generating additional implicit keys from a key $[K_{ij}]_N$ without the necessity of generating a new Diffie-Helman (DH) certificate or requiring any communication between nodes to change keys. A first data processing device (node I) is coupled to a private network which is in turn coupled to the Internet. A second data processing device (node J) is coupled to the same, or to a different network, which is also coupled to the Internet, such that node I communicates with node J using the Internet protocol. Node I is provided with a secret value i and a public value which in one embodiment takes the form $\alpha^i$ mod p. Data packets (referred to as "datagrams") are encrypted using the teachings of the present invention to enhance network security. A source node I obtains a DH certificate for node J and obtains node J's public value $\alpha^j$ mod p from the DH certificate. Node I then computes the value of, in one embodiment $\alpha^{Nij}$ mod p, and derives a key $[K_{ij}]_{N_i}$ from the value $\alpha^{Nij}$ mod p (or alternatively, $\alpha^{(M^N)ij}$ mod p, where M=2, 3, ... and N=0, 1, 2 ...). Each node maintains an internal value of N which is incremented based on time and upon the receipt of a data packet from another node. In the presently preferred embodiment, the value N is stored within the Security Association ID (SAID) field of an Internet specification of the IP Security Protocol (IPSP) defined by the Internet Engineering Task Force.

The key $[K_{ij}]_{N_i}$ is derived from the appropriate quantity of $\alpha^{Nij}$ by using low order key-sized bits of the respective quantity. The present invention then utilizes the key $[K_{ij}]_{N_i}$ to encrypt a transient key which is referred to as $K_p$. The key $K_p$ is used for a configurable number of bytes, which is the maximum number of bytes the node will encrypt using $K_p$. The key $K_p$ is then encrypted with the key $[K_{ij}]_{N_i}$. The first time a transmitting node I communicates with node J, the node computes the shared secret $\alpha^{Nij}$ mod p. The value of N is initially set by each node to be equal to 1 (or for the $\alpha^{(M^N)ij}$ case, N is initially set to 0), and incremented based on time and updated using the value of N stored in received packets. To calculate $\alpha^{Nij}$ mod p, node I must determine if it has a cached authenticated public DH key for node J. If it does not have this DH key, it must obtain J's DH certificate, verify the DH certificate and cache node J's DH public value. If node I has a cached $[K_{ij}]_{N_i}$ key, and a cached authenticated public DH key for node J, node I then generates a random key $K_p$ and encrypts this key using $[K_{ij}]_{N_i}$. Node I then encrypts the IP data in $K_p$ and encrypts $K_p$ in $[K_{ij}]_{N_i}$. Node I then transmits the encrypted IP datagram packet in the encrypted key $K_p$ to the receiving node J. Node I further includes its current internal value of $N_i$ in SAID bytes of the outgoing packet.

The receiving node J initially sets its internal value of $N_j$ as a variable equal to 1. The internal value of $N_j$ is incremented by 1 based on elapsed time as well as by the receipt of a data packet. Upon receipt of the encrypted data packet from node I, the internal value of $N_j$ is compared to the value of $N_i$ in the SAID field of the received packet. If $N_i$ is greater than node J's internal value $N_j$, node J determines if it has a cached and verified public key for node I. If node J does not have the public key, it obtains a DH certificate for node I and verifies and extracts a DH public value for node I. Node J then computes the value of $[K_{ij}]_{N_i}$ and decrypts the packet using $[K_{ij}]$ and $K_p$. If the packet is valid, the value of $N_j$ is set equal to $N_i$. If, however, node J determines that the value of $N_i$ is less than node J's internal value $N_j$, the data packet is considered to be invalid and discarded. If $N_i$ is equal to $N_j$, node J determines if it is a cached and verified DH public key for node I. As in the prior case, if node J does not have a cached and verified DH public key for node I, node J proceeds to obtain the DH certificate for node I and extracts the DH public value for node I. The value of $[K_{ij}]_{N_j}$ is then determined and cached for later use. Node J then proceeds to decrypt the encrypted value of $K_p$ in the received data packet using $[K_{ij}]_{N_i}$ and decrypts the IP data utilizing $K_p$.

The present invention further provides for the application of one-way functions to the shared secret to enhance security. It has been found that forward security may be obtained through the generation of an implicit pair-wise secret having the value $\alpha^{(M^N)ij}$ mod p. In the present invention, the value of M is equal to 2, however other integers may also be used. Thus, if the value $[K_{ij}]_N$ is compromised at any point, either node I or node J may change the context such that the compromised $[K_{ij}]_N$ is not useable by a cracker to either decrypt prior packets or future packets sent over the Internet. In addition, the present invention further provides methods and apparatus for achieving perfect forward security for closed user groups. Each node in a closed user group precomputes all shared secrets (e.g., $\alpha^{(2^N)ij}$ mod p) for each closed group node. Each node then deletes its secret (i, j, . . . , etc.). As the value of N is incremented, each node may compute $[K_{ij}]_N$ for any value of N without the need to recalculate the shared secret. Upon receipt of a data packet in the context $N_i$ (for a datagram transmitted, for example, by node I), a receiving node J computes $[K_{ij}]_{N_i}$ and decrypts the data packet using $K_p$. Since it is not necessary to compute the implicit shared secret between the nodes in the closed user group, perfect forward secrecy is achieved since a cracker's discovery of the value of $[K_{ij}]_{N_i}$, and thereby the value for a particular N of $\alpha^{(2^N)ij}$ mod p, will not assist in decrypting packets encrypted in contexts earlier than $N_i$.

The present invention further provides an improved application of the SKIP methodology to datagram multicast protocols. Where secure multicasting to a multicast address M is required, a group membership creation primitive establishes the group key $K_g$ and the membership list of addresses that are permitted to transmit and receive datagrams to and from address M. In the case of multicasts, the group key $K_g$ is not used as a packet encryption key, but rather as a group interchange key (GIK). $K_g$ is therefore used as a key encrypting key similar to the way in which pair keys $[K_{ij}]_N$ are used in SKIP for unicast methodologies. Nodes wishing to encrypt and decrypt datagrams to the multicast address M acquire the GIK $K_g$. In the presently preferred embodiment, the acquisition of group interchange key is accomplished by sending an encrypted request to join to the group owner. If the requesting nodes address is part of the group authorized membership list, the group owner then sends the GIK to the requesting node. The currently envisioned application of the present invention's improved datagram multicast protocol is further described with reference to an Internet standard proposed by the inventor of this patent.

Notation and Nomenclature

Figure 1:
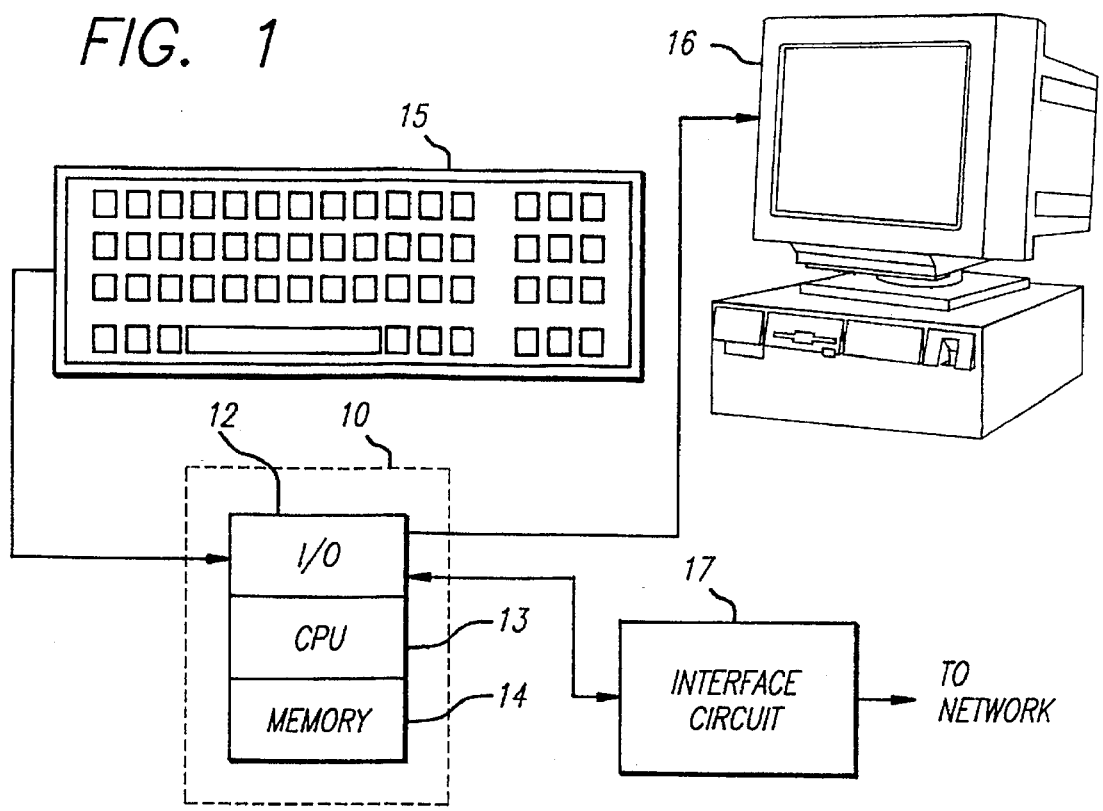
FIG. 1 illustrates a data processing system incorporating the teachings of the present invention.

The detailed descriptions which follow are presented largely in terms of symbolic representations of operations of data processing devices coupled to a network. These process descriptions and representations are the means used by those skilled in the data processing arts to most effectively convey the substance of their work to others skilled in the art.

An algorithm is here, and generally, conceived to be a self-consistent sequence of steps leading to a desired result. These steps are those requiring physical manipulations of physical quantifies. Usually, though not necessarily, these quantities may take the form of electrical or magnetic signals capable of being stored, transferred, combined, compared, displayed and otherwise manipulated. It proves convenient at times, principally for masons of common usage, to refer to these signals as bits, values, elements, symbols, operations, messages, terms, numbers, or the like. It should be borne in mind, however, that all of these similar terms are to be associated with the appropriate physical quantifies and are merely convenient labels applied to these quantifies.

In the present invention, the operations referred to are machine operations. Useful machines for performing the operations of the present invention include general purpose digital computers (referred herein as "nodes"), or other similar devices. In all cases, the reader is advised to keep in mind the distinction between the method operations of operating a computer and the method of computation itself. The present invention relates to method steps for operating a computer, coupled to a series of networks, and processing electrical or other physical signals to generate other desired physical signals.

The present invention also relates to apparatus for performing these operations. This apparatus may be specially constructed for the required purposes or it may comprise a general purpose computer selectively activated or reconfigured by a computer program stored in the computer. The method/process steps presented herein are not inherently related to any particular computer or other apparatus. Various general purpose machines may be used with programs in accordance with the teachings herein, or it may prove more convenient to construct specialized apparatus to perform the required method steps. The required structure for a variety of these machines will be apparent from the description given below.

DETAILED DESCRIPTION OF THE INVENTION

In the following description, numerous specific details are set forth such as system and network configurations, representative data packets, messages, and devices, etc., to provide a thorough understanding of the present invention. However, it will be apparent to one skilled in the art that the present invention may be practiced without these specific details. In other instances, well known circuits and structures are not described in detail in order to not obscure the present invention. Moreover, certain terms such as "knows", "verifies", "examines", "utilizes", "finds", "determines", "challenges", "authenticates", etc., are used in this Specification and are considered to be terms of art. The use of these terms, which to a casual reader may be considered personifications of computer or electronic systems, refers to the functions of the system as having human-like attributes, for simplicity. For example, a reference herein to an electronic system as "determining" something is simply a shorthand method of describing that the electronic system has been programmed or otherwise modified in accordance with the teachings herein. The reader is cautioned not to confuse the functions described with everyday human attributes. These functions are machine functions in every sense.

Exemplary Hardware

FIG. 1 illustrates a data processing system in accordance with the teachings of the present invention. Shown is a computer 10, which comprises three major components. The first of these is an input/output (I/O) circuit 12 which is used to communicate information in appropriately structured form to and from other portions of the computer 10. In addition, computer 10 includes a central processing (CPU) 13 coupled to the I/O circuit 12 and a memory 14. These elements are those typically found in most general purpose computers and, in fact, computer 10 is intended to be representative of a broad category of data processing devices. Also shown is an interface circuit 17 coupled to the I/O circuit 12 for coupling the computer 10 to a network, in accordance with the teachings herein. The interface circuit 17 may include encrypting and decrypting circuitry incorporating the present invention, or as will be appreciated, the present invention may be implemented in software executed by computer 10. A raster display monitor 16 is shown coupled to the I/O circuit 12 and issued to display images generated by CPU 13 in accordance with the present invention. Any well known variety of cathode ray tube (CRT) or other type of display may be utilized as display 16.

Figure 2:
FIG. 2 diagrammatically illustrates one possible network scheme using the teachings of the invention in an Internet environment.

Referring now to FIG. 2, a simplified diagram conceptually illustrates the Internet 20 coupled to a private network 22, a second private network 26, and a third private network 30. The network topology illustrated in FIG. 2 is representative of the existing Internet topology, however, it will be noted that the present invention provides an improved key management scheme which has application for use in networks other than the Internet.

One of the unique aspects of the Internet system is that messages and data are transmitted through the use of datagram packets. In a datagram-based network, messages are sent from a source to a destination in a similar manner to a government mail system. For example, a source computer may send a datagram packet to a destination computer regardless of whether or not the destination computer is currently on-line and coupled to the network. The Internet protocol (IP) is completely session-less, such that IP datagram packets are not associated with one another.

In this Specification, the present invention will be described with reference to communication between a node I coupled to private network 22, and a node J coupled to the private network 30, as shown in FIG. 2. The nodes I and J represent computers, such as the computer illustrated in FIG. 1, coupled to their respective networks. For simplicity and ease of understanding, an operation by, for example, "node I", shall be understood to mean an operation by the computer coupled to network 22. It will also be noted that although FIG. 2 represents nodes I and J as intermediate or end user computers, that the present invention may also be applied to firewalls. In such event, nodes I and J would represent firewall machines coupled between their respective networks and the Internet 20. For a description of the application of SKIP to site firewalls, the reader is referred to my co-pending parent application, Ser. No. 08/258,344, filed Jun. 10, 1994, entitled "METHOD AND APPARATUS FOR KEY-MANAGEMENT SCHEME FOR USE WITH INTERNET PROTOCOLS TO SITE FIREWALLS".

As described in my co-pending parent application, and incorporated herein by reference, one way to obtain authenticity and privacy at a datagram layer is to use RSA public key certificates. Traditionally, in the event node I desires to send a datagram to, for example, node J, the node I communicates with node J and authenticates itself using a certificate based key management infrastructure. An example of a certificate based infrastructure key management for secure Internet e-mail is the Privacy Enhanced Mail (PEM) system (see the PEM RFC documents filed concurrent with the Application upon which this patent is based, and incorporated herein by reference, entitled "Privacy Enhancement for Internet Electronic Mail", parts I–IV rfcs 1421–1424, available on the Internet).

The certificates used by PEM are RSA public key certificates. An RSA public key certificate is one which contains an RSA public key. (See, A. Aziz, W. Diffie, "Privacy and Authentication for Wireless LANs", IEEE Personal Communications, February 1994; and also, W. Diffie, M. Wiener, P. Oorschot, "Authentication and Authenticated Key Exchanges".) There are two primary ways in which RSA certificates can be used to provide authenticity and privacy for a datagram protocol. The first way is to use out-of-band establishment of an authenticated session key, using one of several session key establishment protocols. This session key can then be used to encrypt IP data traffic. Such a scheme has the disadvantage of establishing and maintaining a pseudo session state on top of a session-less protocol. The IP source must first communicate with the IP destination to acquire this session key. In addition, when the session key must to be changed to insure security, the IP source and the IP destination need to communicate again to effectuate the change. Each such communication involves the use of a computationally expensive public-key operation. This communication requirement is particularly ill-suited to a datagram protocol like IP, which does not require the receiving computer to be in operation to send packets to it, although to establish and change negotiated session keys the receiving computer must be operational.

The second way an RSA certificate can be used to provide authenticity and privacy in a datagram protocol is to complete in-band signalling of the packet encryption key, such that the packet encryption key is encrypted in the recipient's public key. This is the method PEM utilizes to accomplish message encryption. Although this avoids the session state establishment requirement, and also does not require the two parties to communicate to set up and change packet encryption keys, this scheme has the disadvantage of having to carry the packet encryption key encrypted in the recipient's public key in every packet. Since an RSA encrypted key would minimally need to be 64 bytes, and can be 128 bytes, this scheme incurs the overhead of 64–128 bytes of keying information in every packet. In addition, when the packet encryption key changes, a public key operation would need to be performed to recover the new packet encryption key. Thus, both the protocol and computational overhead of such a scheme is high.

As disclosed in my parent applications, the use of Diffie-Hellman (DH) public-key certificates avoids the pseudo session state establishment, and the communications requirement between the two communicating computers to acquire and change packet encrypting keys (see, W. Diffie, M. Hellman, "New Directions in Cryptography", IEEE Transactions on Infomarion Theory). Furthermore, the use of a DH public-key certificate does not incur the overhead of carrying 64–128 bytes of keying information in every packet, and is better suited to protocols such as IP, since it does not require the receiving computer to be operational to establish and change packet encrypting keys.

Figure 3:
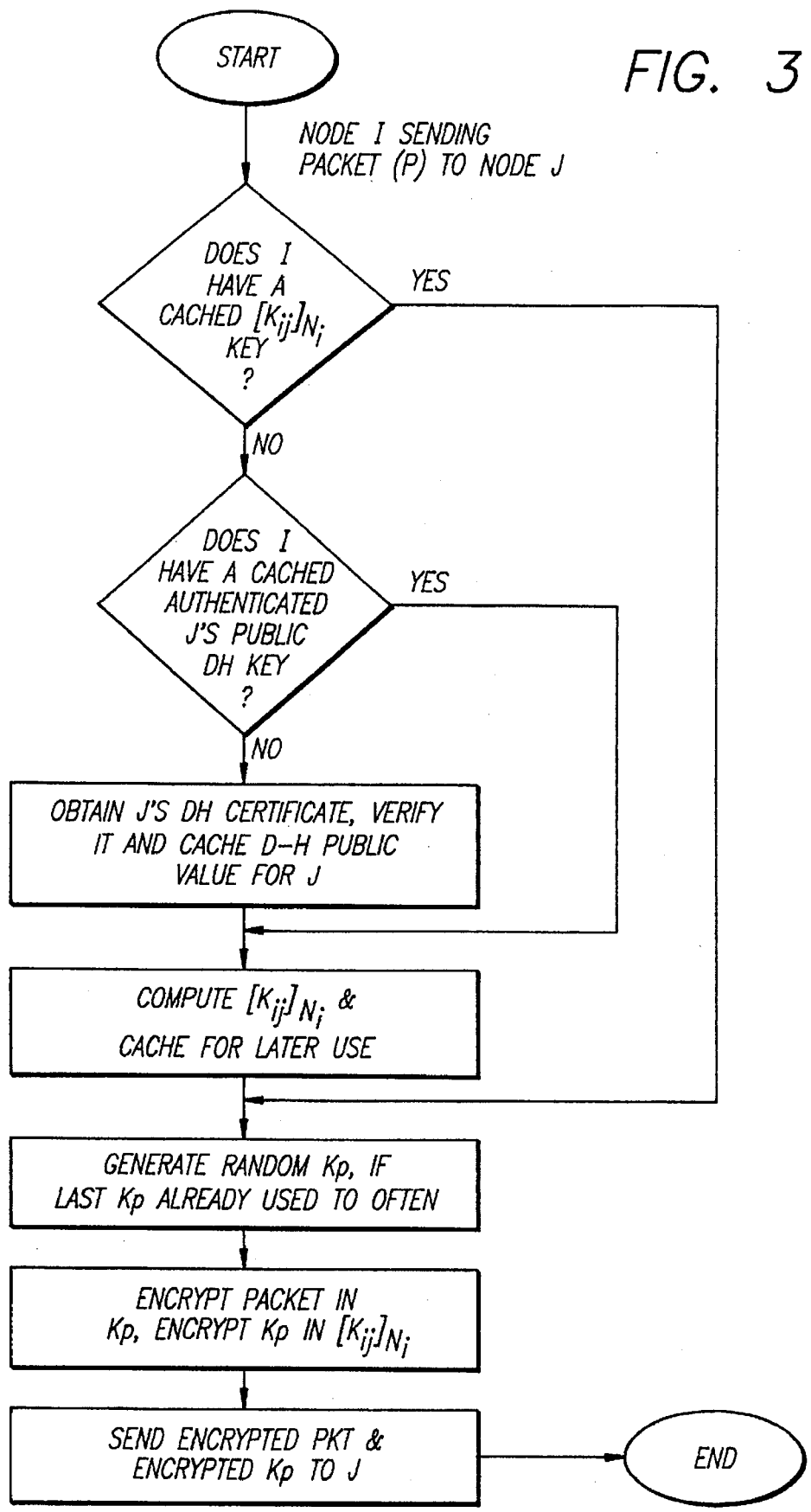
FIG. 3 illustrates a flow chart of the steps executed in sending an encrypted data packet from a network node I to a network node J, in accordance with the teachings of the present invention.

Referring now to the flow charts illustrated in FIGS. 3 and 4, the present invention utilizes DH public-key certificates for key management, such that each IP source and destination is provided with a Diffie-Hellman public key. This DH public-key is distributed in the form of a certificate. The certificate can be signed using either an RSA or DSA signature algorithm. The certificate is referred to herein as a "Diffie-Hellman" (DH) certificate, because the public value that is certified is a Diffie-Hellman public value.

It will be appreciated that the present invention's use of DH certificates to compute a shared key is fundamentally different than the use of the DH certificate to negotiate a session key, for example, as described in the paper by Whitfield Diffie, entitled "Authentication and Authenticated Key Exchanges" (Kluwer Academic Publishers, 1992), because the present invention uses a zero-message protocol to compute a shared secret. All past uses of DH certificates have involved exchanging messages between the two communicating parties.

As will be described, the present invention discloses an improved method and apparatus for generating additional implicit interchange keys for use with the SKIP scheme previously disclosed in the applicant's copending parent applications of this continuation-in-part application. For purposes of this Specification, a "context" is an implicit interchange key, where an interchange key is a key which is used to encrypt other keys, as opposed to a traffic key. For example, in the parent applications $K_{ij}$ was considered the interchange key. Accordingly, it is desirable to step the interchange key creating new additional interchange keys, thereby creating further secrets from the original implicit pair-wise interchange key generated. In accordance with the original teachings in the parent applications, upon initialization, each IP source or destination computer, for example node I, is provided with a secret value i, and computes a public value $\alpha^i$ mod p. Similarly, node J is provided with a secret value j, and computes a public value $\alpha^j$ mod p. For purposes of illustration, assume that node I wishes to communicate to node J coupled to private network 30 in FIG. 2. As previously described in the parent applications, both I and J can acquire a shared secret $\alpha^{ij}$ mod p without having to communicate, so long as the public key of each IP node is known to all other IP nodes. The values $\alpha$ and p are system parameters, where p is a prime number. It will be appreciated by one skilled in the art that local caching of DH certificates can eliminate the constant need for directory service, thereby minimizing system overhead.

One improvement of the present invention is to create additional shared secrets of $\alpha^{ij}$ mod p. Utilizing the SKIP scheme, the computable shared secret is used as a key encrypting key to provide for IP packet based authentication and encryption. Thus, $\alpha^{ij}$ mod p was defined in the original SKIP scheme as a "long term key", and the value $K_{ij}$ was derived from this long term key. The key $K_{ij}$ is used as the key for a known shared key cryptosystem (SKCS) such as DES or RC2. $K_{ij}$ constitutes an implicit pair-wise share secret, since $K_{ij}$ does not need to be sent in every packet or negotiated out of band. Simply by examining the source of an IP packet, the destination IP node (for example node J) may compute the shared secret $K_{ij}$.

As disclosed herein, the successive application of a function to the value $\alpha^{ij}$ mod p results in the creation of additional implicit pair-wise shared secrets without the necessity of communicating the shared secret between nodes I and J or obtaining a new DH certificate.

In this Specification, the value $[K_{ij}]_N$ denotes the Nth implicit key, where N is indicated in the received packet, as will be described more fully below. Additionally, the quantity $[K_{ij}]_N$ may be determined by evaluating the quantity $\alpha^{Nij}$ mod p where N=1, 2, ..., or alternatively, $\alpha^{(M^N)ij}$ mod p; where N=0,1,2 ... Z, and M=2,3,4 ... y. As in the original SKIP scheme which is the subject of my parent applications, the key $[K_{ij}]_N$ is derived from the appropriate quantity of $\alpha^{Nij}$ mod p (or $\alpha^{(M^N)ij}$ mod p) by using low order key size bits of the respective quantity. The way in which $\alpha^{Nij}$ is computed is by a simple extrapolation of the DH scheme. Each node computes $(\alpha^i)^N = \alpha^{iN}$, and in turn raise it to its secret $(\alpha^{iN})^j = \alpha^{Nij}$. In this Specification, it will be appreciated that the present invention may be realized using either $\alpha^{Nij}$ mod p, or alternatively, $\alpha^{(M^N)ij}$. The use of $\alpha^{(M^N)ij}$ mod p provides additional security, and as will be described, forward secrecy. N is a number that is stored on a pairwise basis in each node. The value of N may be different for different nodes, J, K, ..., etc.

Since $\alpha^{Nij}$ mod p is minimally at least 512 bytes (and for greater security may be 1024 bytes or higher), sufficient bytes may be derived for use as $K_{ij}$ used as a key for the SKCS. Typically, SKCS key sizes are in the range of 40–172 bits.

As provided by the SKIP scheme, the present invention then utilizes the key $[K_{ij}]_N$ to encrypt a "transient key", which is referred to as $K_p$. The key $K_p$ is generated at random to encrypt a configurable number of data packets. After the configurable number of data packets have been sent, a new $K_p$ is generated at random. The transient key $K_p$ is used to encrypt an IP data packet, or a collection of IP data packets. The encryption using $K_p$ limits the amount of data in the long-term key which a potential cracker can access. Since it is desirable to retain the long-term key for a relatively long period of time (one or two years), the actual IP data traffic is not encrypted in key $[K_{ij}]_N$. In the preferred embodiment of the invention, only the transient keys of the long-term key are encrypted using $[K_{ij}]_N$, and the transient keys are used to encrypt IP data traffic. Thus, the amount of data encrypted in the long-term key $[K_{ij}]_N$ is limited to a relatively small amount over a long period of time.

For purposes of explanation, assume that $[K_{ij}]_N$ is derived from $\alpha^{Nij}$ mod p. As previously noted, the generalized one-way function of $\alpha^{(M^N)ij}$ mod p may also be used. The first time the IP source, such as node I, which has been provided with the secret value i, communicates with the IP node J which has been provided with a secret value j, the node I computes the shared secret $\alpha^{Nij}$ mod p. As will be described, the value of N is an internal value which is initially set by each node to be equal to 1, and incremented based on time and updated using the value of N stored in received packets. In the presently preferred embodiment of the invention, the value N is disposed within a field identified as the Security Association ID ("SAID") in a Specification of IP Security Protocol (IPSP) defined by the Internet Engineering Task Force. The SAID field includes user definable bytes which the present invention utilizes to transmit the value of N. However, it will be appreciated that a variety of mechanisms may be utilized to transmit the value of N, and that the use of the SAID field is only one mechanism of many.

Referring now to FIG. 3, the sequence of steps utilized by the present invention to encrypt and transmit a packet is illustrated. As shown, a transmitting node I initially sets an internal value of $N_i$=to 1 (or $N_i$=0, for the $\alpha^{(M^N)ij}$ case), and determines whether or not node I has a previously cached $[K_{ij}]_{N_i}$ key. The first time an IP source, such as node I, which has been provided with the secret value i, communicates with the IP node J which has been provided with the secret value j, the node I computes the shared secret $\alpha^{Nij}$ mod p. To calculate $\alpha^{Nij}$ mod p, node I must determine if it has a cached authenticated public DH key for node J. If node I does not have this DH key, it must obtain node J's DH certificate, verify the DH certificate and cache node J's DH public value (see FIG. 3). The value of $[K_{ij}]_{N_i}$ is then computed and cached.

As illustrated in FIG. 3, if node I has a cached $[K_{ij}]_{N_i}$ key, and a cached authenticated public DH key for node J, these steps are not repeated. Node I then generates a random key $K_p$ and encrypts this key using $[K_{ij}]_{N_i}$. Node I then encrypts the IP packet data in $K_p$, and encrypts $K_p$ in $[K_{ij}]_{N_i}$. Node I then transmits the encrypted IP datagram packet and the encrypted key $K_p$ to the receiving node J. Node I further includes its current internal value of $N_i$ in the SAID field of the outgoing packet. The outgoing datagram packet sent by the source node I takes the form illustrated in FIG. 6.

Figure 4A:
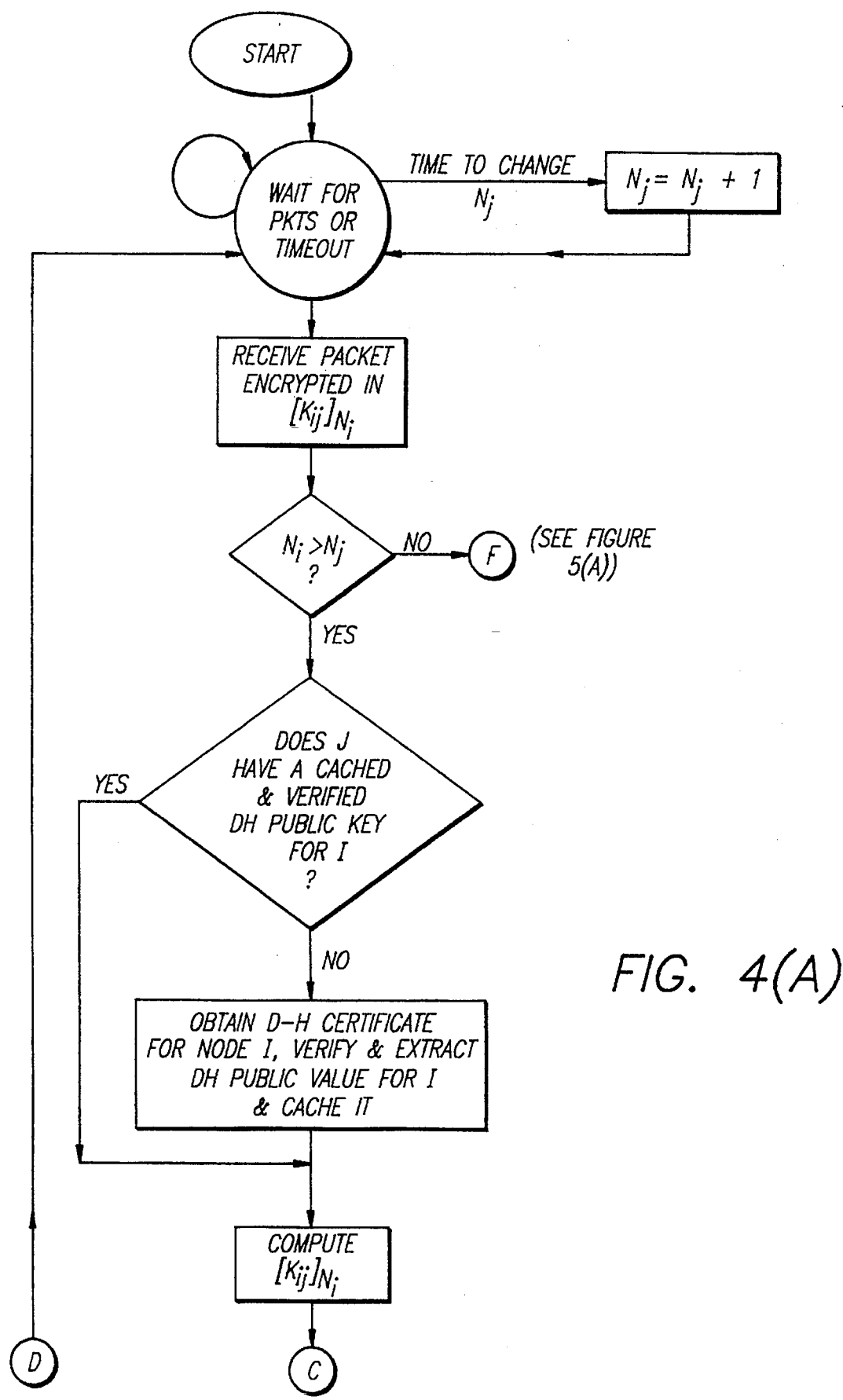
FIGS. 4(a) and 4(b) are flow charts of the steps executed by each node to change the value of the variable N in the calculation of $[K_{ij}]_N$ and to decrypt a data packet where $N_i < N_j$.
Figure 4B:
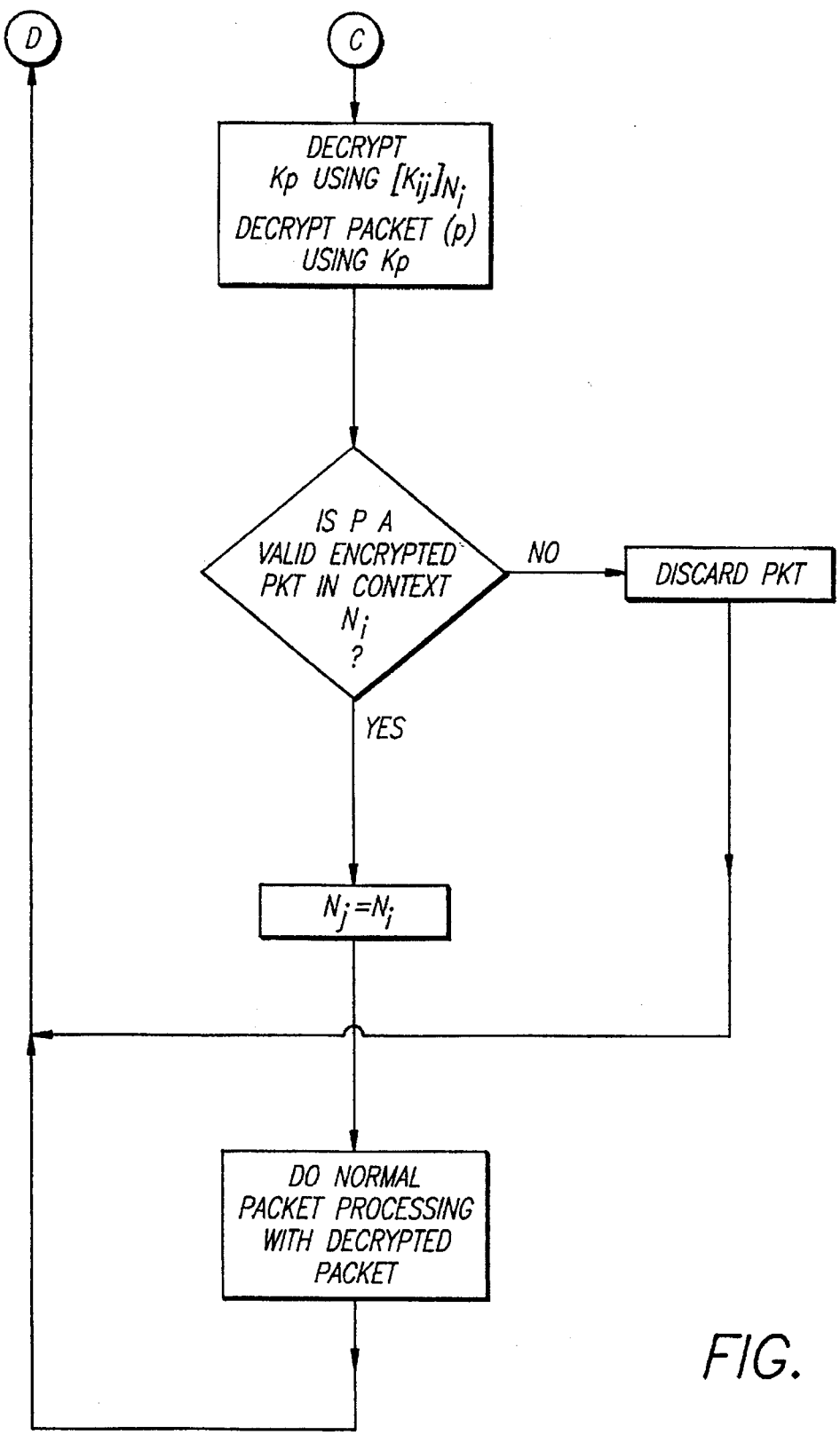

Referring now to FIGS. 4(a), 4(b) and 5, the steps for receiving and decrypting the data packet sent by node I to node J will be described. As shown in FIG. 4(a), the receiving node J initially sets its internal value of $N_j$ as an variable which is changed internally, or upon the receipt of a valid encrypted package. For example, as shown in FIG. 4(a) after a predetermined time the internal value of $N_j$ in node J is incremented by $N_j$+1. The incrementing of N is done in the same manner for each node as that described herein with reference to node J. However, for simplicity and ease of understanding, only the case of node J is described in this Specification.

Upon the receipt of an encrypted data packet from node I the internal value of the variable $N_j$ at node J is compared to the value of $N_i$ in the SAID field of the received packet. If $N_i$ is greater than node J's internal value $N_j$, node J determines if it has a cached and verified public key for node I. If node J does not have the public key, it obtains a DH certificate for node I and verifies and extracts a DH public value for node I. Node J then computes the value of $[K_{ij}]_{N_i}$ and decrypts the packet (P) using $[K_{ij}]_{N_i}$ and $K_p$. Node J then determines if the packet P is a valid encrypted packet in the context $N_i$. This determination may be accomplished in using a number of mechanisms including checksum verifications, examining header formats and the like. If the packet is not validly encrypted in context $N_i$, then the data packet is considered invalid and discarded. If the data packet (P) is determined to be a valid encrypted packet in the context $N_i$ then the internal value of $N_j$ for node J is set equal to $N_i$. Normal data packet processing is then done by node J.

Figure 5A:
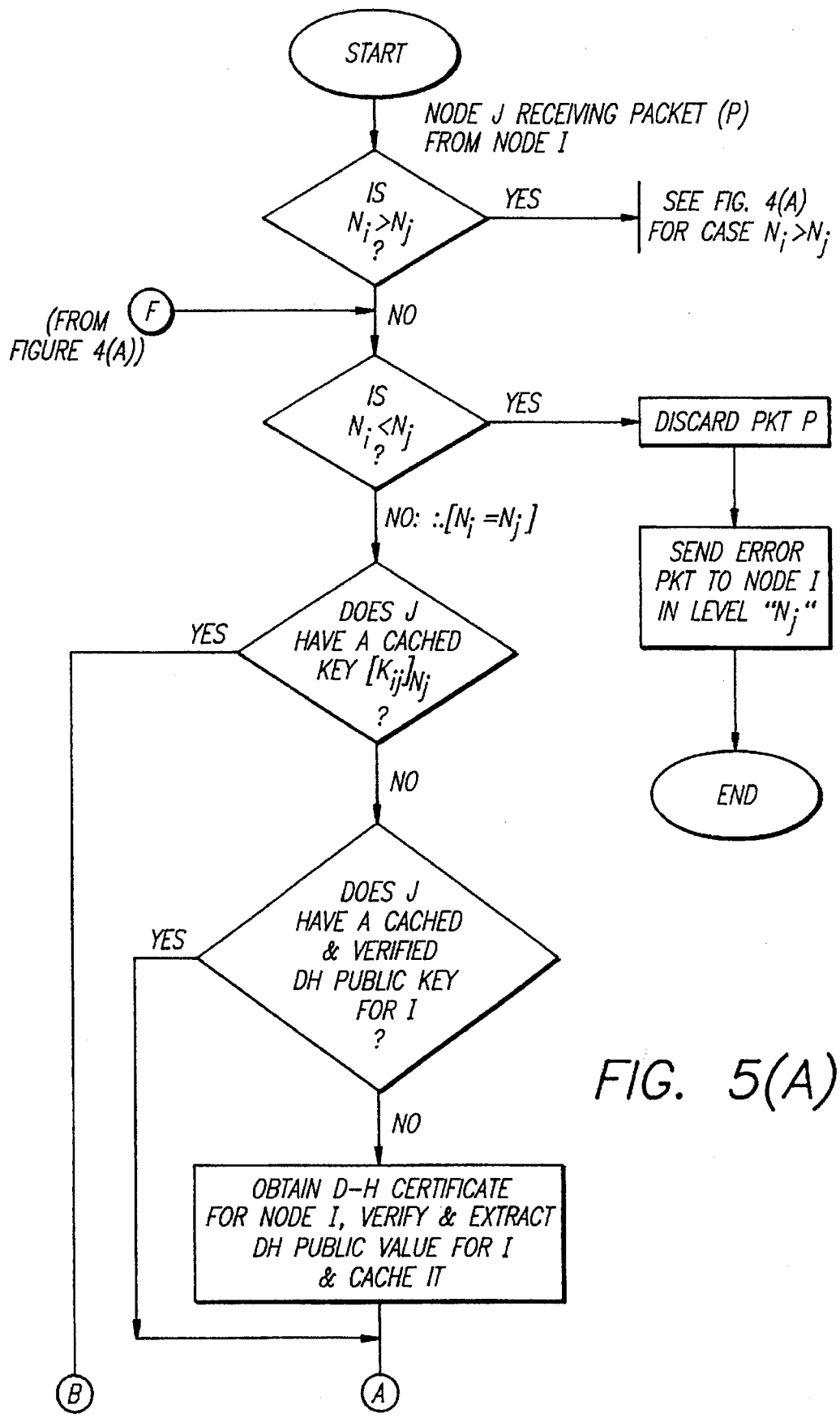
FIGS. 5(a) and 5(b) are flow charts of the steps executed for the receipt of encrypted data packets by node J from node I where $N_i=N_j$ and $N_i<N_j$.
Figure 5B:
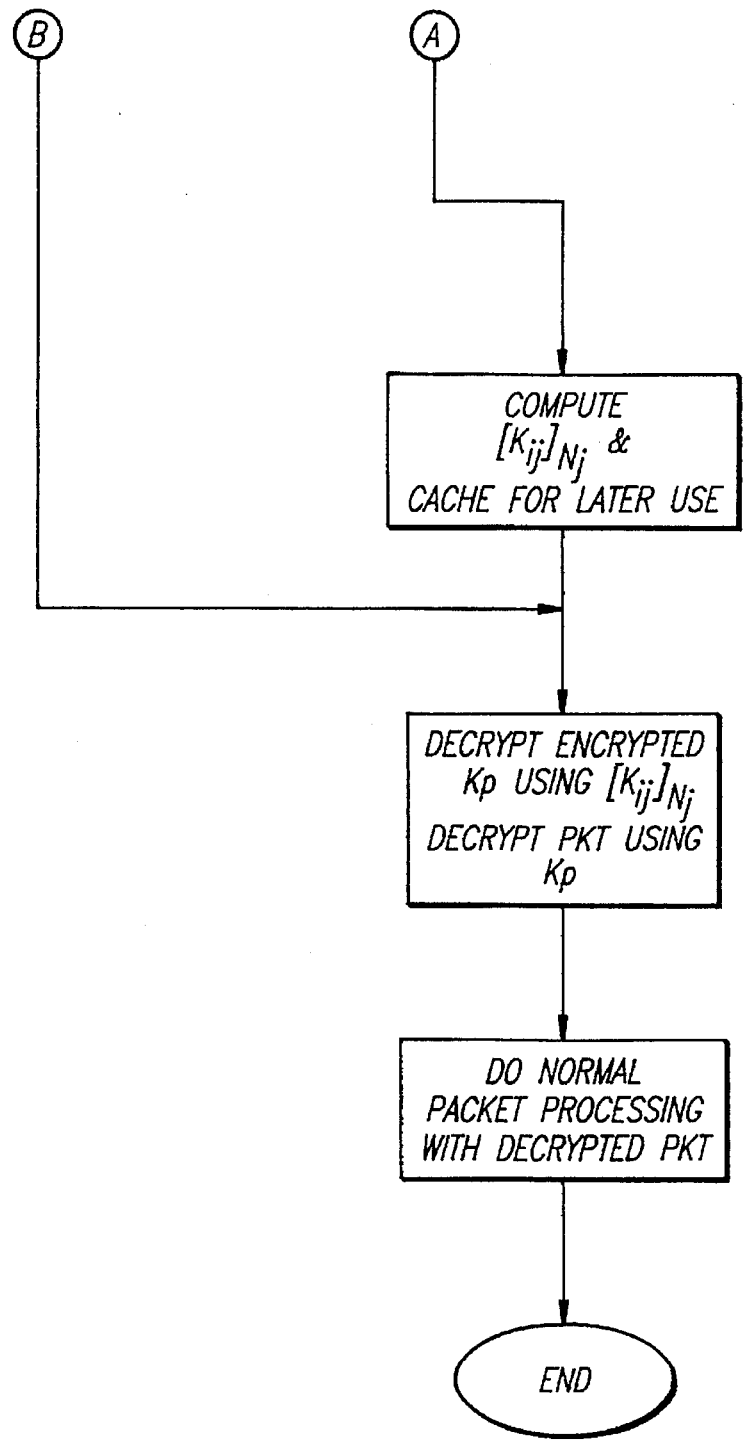

Continuing to refer now to FIGS. 5(a) and 5(b), if node J determines that the value of $N_i$ in the SAID field is less than node J's internal value $N_j$, the data packet is considered to be invalid and discarded. Since in accordance with the teachings with the present invention the value of $N_i$ and $N_j$ may only increase, the case where a received data packet provides a value of $N_i$ which is less than $N_j$ denotes an error condition.

If $N_i$ is equal to $N_j$, node J determines if it has a cached and verified DH public key for node I. If node J does not have a cached and verified DH public key for node I, node J proceeds to obtain the DH certificate for node I, verifies the certificate, and extracts the DH public value for node I. The value of $[K_{ij}]_{N_i}$ is then determined and cached for later use. As illustrated in FIG. 3, node J then proceeds to decrypt the encrypted value of $K_p$ in the received data packet using $[K_{ij}]_{N_i}$, and decrypts the IP data utilizing $K_p$. Node J then completes normal packet processing with the decrypted data packet. Normal packet processing may include the delivery to an appropriate local transport entity, or other outbound interface.

Figure 6:
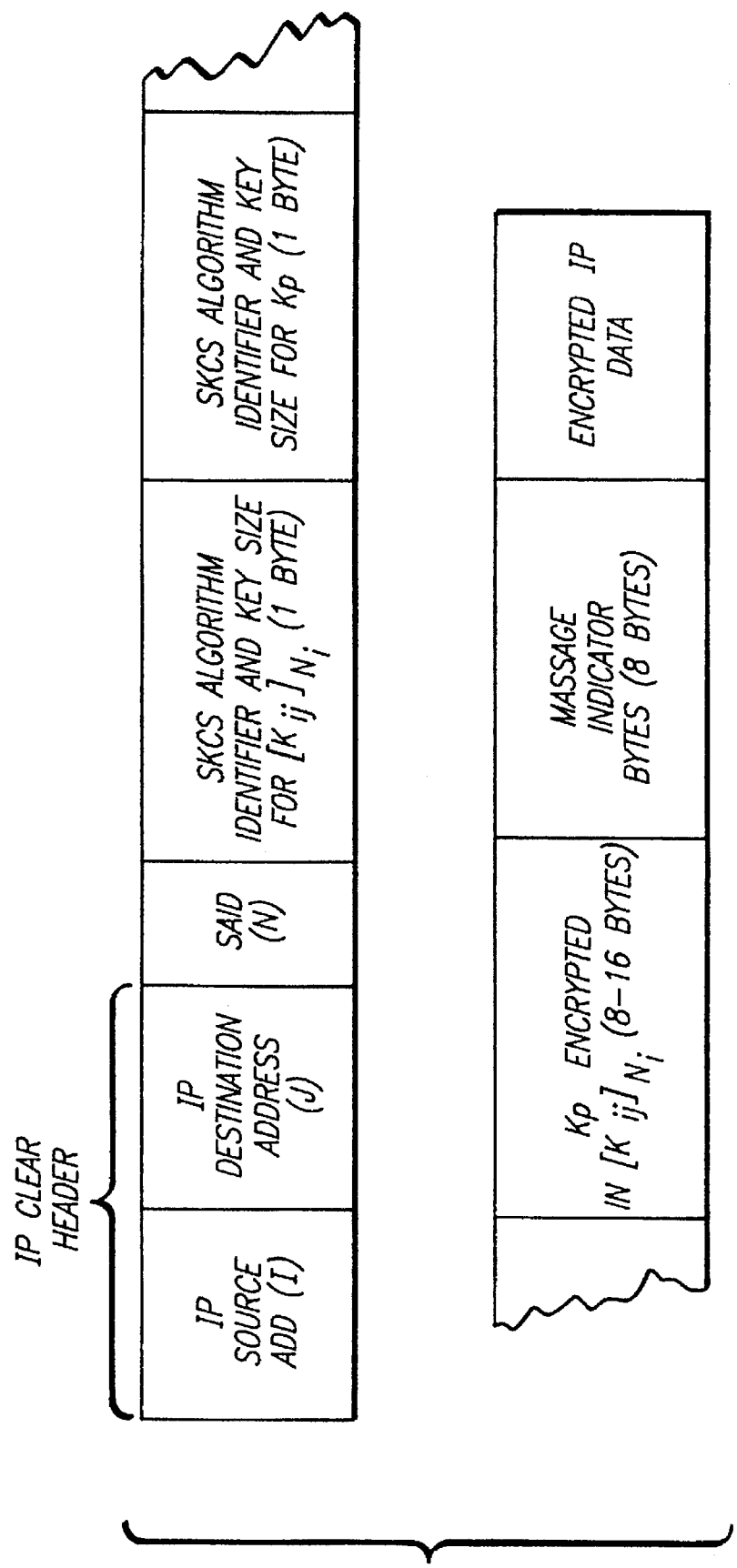
FIG. 6 diagrammatically illustrates the transmission format of an encrypted datagram.

Referring briefly to FIG. 6, the Message Indicator (MI) is a field that is used to preserve the statelessness of the protocol of the present invention. If a single key is used to encrypt multiple packets, (which is highly desirable since changing the key on a per packet basis constitutes significant computational overhead) then the packets need to be decryptable regardless of lost or out-of-order packets. The MI field serves this purpose. The actual content of the MI field is dependent on the choice of SKCS used for $K_p$ and its operating mode. For example, if $K_p$ refers to a block cipher (e.g. DES) operating in Cipher-Block-Chaining (CBC) mode, then the MI for the first packet encrypted in key $K_p$ is the Initialization Vector (IV). For subsequent packets, the MI is the last blocksize-bits of ciphertext of the last (in transmit order) packet. For DES or RC2 this would be 64 bits. For stream ciphers like RC4, the MI is simply the count of bytes that have already been encrypted in key $K_p$ (and may also be 64 bits).

If the source node I decides to change the packet encryption key $K_p$, the receiving node J can discover this fact without having to perform a public-key operation. The receiving node J uses the cached value $[K_{ij}]_{N_j}$ to decrypt the encrypted packet key $K_p$, and this is a shared-key cryptosystem operation. Thus, without requiring communication between transmitting (I) and receiving (J) ends, and without necessitating the use of a public-key operation, the packet encrypting key can be changed by the transmitting side.

Since DH certificates are used, the nodes I and J have no public-key signature algorithm. It will be appreciated that the lack of a public-key signature algorithm is not a major issue, since signing each packet using a public-key cryptosystem is too cumbersome in any case. In accordance with the present invention, the integrity of the packets is determined in a pair-wise fashion using a SKCS.

Application of One-Way Functions

In any security system, it is generally assumed that the keys are not compromised. For sake of example, assume that a cracker successfully obtains $K_p$. The cracker can then also learn of the encryption of $K_p$ under $K_{ij}$ because this information is part of the packet header. The cracker may then send forged traffic to either nodes I or J pretending to be the other node. (This scenario is not considered likely as this involves breaking a cryptosystem which is not required to be weak.) In addition, if a cracker learns a node's secret (e.g., i), this allows the cracker to decrypt all traffic that was sent encrypted by using $\alpha^{ij}$ mod p as the interchange key.

By deleting i (each nodes private DH key) and successively applying one-way functions of the type $\alpha^{(M^N)ij}$ (where $N=0, 1, 2, 3, \ldots$ and $M=2, 3, \ldots$) perfect forward secrecy may be achieved in closed user groups. In a closed user group, all the nodes can pre-compute their respective pair-wise shared secrets $\alpha^{ij}$ mod p, for all possible i and j. The nodes then delete their respective DH secrets i, j, . . . , etc. Each time they decide to step the context (defined as an implicit shared key) they can compute the $N^{th}$ level interchange key from any level interchange key without requiring the long-term DH secrets i, j, . . . , etc. Assume I is computing the $N^{th}$ level interchange key from the S level secret, which is defined as $\alpha^{(M^S)ij}$.

To compute the Nth level secret, node I can compute the following, starting with the S level secret:

$$(\alpha^{(M^S)ij} \bmod p)^{M^{N-S}} = \alpha^{(M^{N-S+S})ij}$$
$$= \alpha^{(M^N)ij}$$

It will be appreciated that since node I knows both S, M, and N, it can raise the S level secret to the power $M^{N-S}$ without needing to know either i or any prior secret. Once it has computed the N level secret, it can delete the S level secret, since the context numbers only step forward and never back. If a node should be compromised at some point in time, when it is at context level N, then this compromise does not reveal the implicit shared secrets at levels less than N. This is because the long term secret no longer exists on the node, and secrets at levels less than N cannot be computed because exponentiation modulo p is a one-way function, and breaking it is computationally intensive.

Even assuming that a cracker discovers $[K_{ij}]_{N_i}$, since nodes I and J have stepped the context thereby changing the implicit interchange key, the information obtained by the cracker would be of no value. It has been found that perfect forward secrecy may be obtained through the generation of an implicit pair-wise secret having the value of $\alpha^{(M^N)ij}$ mod p. In the present embodiment, and for purposes of description, M=2 thereby providing a one-way function $\alpha^{(2^N)ij}$ mod p. For example, incrementing N results in the following representative values of $\alpha^{(2^N)ij}$ mod p:

Value N

1 $(\alpha^{ij})^2_{\bmod p} \rightarrow \alpha^{2ij}_{\bmod p}$
2 $(\alpha^{2ij})^2_{\bmod p} \rightarrow \alpha^{4ij}_{\bmod p} \leftarrow (\alpha^{2^2 ij})$
3 $(\alpha^{4ij})^2_{\bmod p} \rightarrow \alpha^{8ij}_{\bmod p} \leftarrow (\alpha^{2^3 ij})$
.
.
N $\alpha^{2^n ij}_{\bmod p}$ We consider $\alpha^{(M^N)ij}$ a one-way function because computing Mth roots modulo p, is computationally impractical. As the result of the repeated squaring of the value $\alpha^{(2^N)ij}$ mod p, once N is determined by the receiving node (node J) the quantity $\alpha^{(2^N)ij}$ mod p provides perfect forward secrecy. In this Specification, perfect forward secrecy means that if $[K_{ij}]_N$ is compromised at any point, then earlier traffic encrypted M contexts $[K_{ij}]_M$, M=1, 2, . . . , N-1, is not compromised. This is because $[K_{ij}]_M$, for M=1, 2, . . . M-1, is not revealed by knowing $[K_{ij}]_N$, since N>M.

Perfect Forward Secrecy For Closed User Groups

As described above, both node I and node J must maintain the values of i and j to generate the implicit pair-wise secret. It will be appreciated that to calculate the value of $\alpha^{(2^N)ij}$ mod p it is not necessary for node I to retain the value of i. However, the deletion of i requires that all of the pair keys for the members of a closed user group be pre-computed prior to the deletion. The concept of perfect forward secrecy is driven by the notion that if a user group's equipment is compromised such that the keys are discovered, the data which has been encrypted previously should not be compromised by the discovery. An enemy agent could determine any of the previously used values of $\alpha^{Nij}$ once he has obtained the value of i. Thus, the method of the present invention provides that all members of the closed user group pre-compute all $\alpha^{ij}$ values and where $[K_{ij}]_N$ represent values for each of the nodes I, J, K, etc. within the closed user group.

Figure 7:
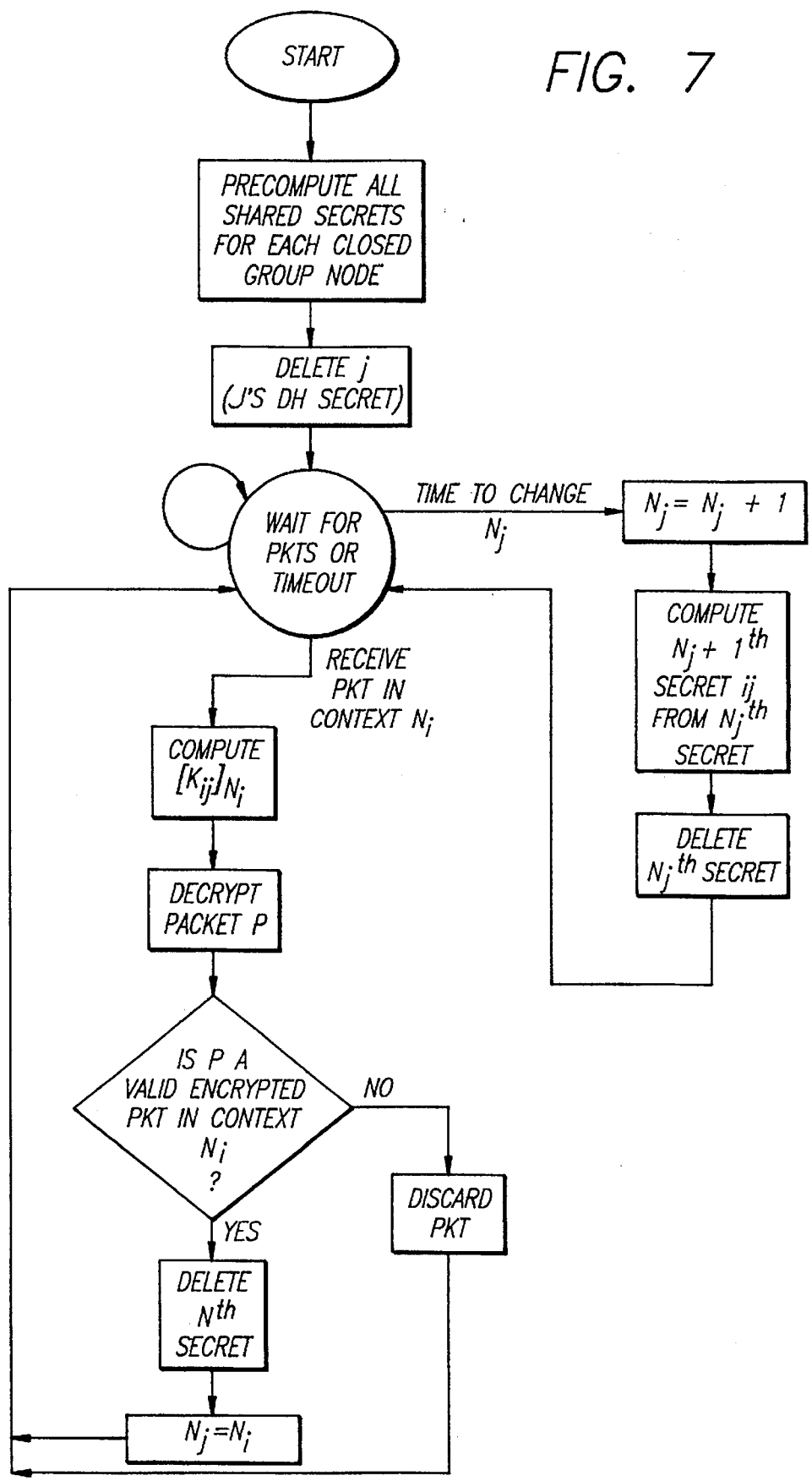
FIG. 7 is a flow chart of the steps executed by the present invention to achieve perfect forward secrecy for closed user groups.

For example, with reference to FIG. 7, once node J calculates all of the long-term pair keys for each of the members of the closed user group, node J may delete its secret value j.

Similarly, all members of the closed user group delete their long-term secrets i, j, . . . As the value of N is incremented, each node may compute $[K_{ij}]_N$ from any value $[K_{ij}]_S$, where S<N for any value of N. Thus, in accordance with the teachings of the present invention, assume that node I has an N level secret $_{ij}$ which is defined as $\alpha^{(2^N)ij}$ mod p. In order to compute the Nth level secret$_{ij}$, node I calculates ($\alpha^{(2^N)ij}$ mod p. If node I is compromised when at a level N, then all traffic encrypted using (N−1) and lower level keys are still protected, because computing Mth roots mod p is computationally difficult.

Referring once again to FIG. 7, the sequence of steps executed by node J to achieve perfect forward secrecy in a closed user group is illustrated. As shown, node J precomputes the values of the shared secrets (e.g., $\alpha^{(2^N)ij}$ mod p for node I) in the closed user group. Node J then deletes its secret j. As previously described with reference to FIGS. 3, 4 and 5, node J increments its internal value $N_j$ after a predefined time out, or upon the receipt of a data packet. When node J increments the value of $N_j$, it also computes the value of $N_j+1^{th}$ secret$_{ij}$ from the $N^{th}$ secret. The $N_j^{th}$ secret is then deleted.

Upon the receipt of a data packet (P) in the context $N_i$ (e.g., a data packet from node I), node J computes $[K_{ij}]_{N_i}$ and decrypts the data packet P. Node J then determines whether the data packet was a valid encrypted packet in context $N_i$ using one of a number of mechanisms previously described with reference to FIGS. 4 and 5. If the packet P is a valid packet in context $N_i$, node J sets its internal $N_j=N_i$.

As will be appreciated, for closed user groups where each node may precompute all secret values and then discard their secrets, perfect forward secrecy may be obtained using one way functions. In the event a new node is added to the closed group, each of the nodes must have a new set of DH certificates/secrets assigned to them. However, for long term closed groups, the present invention's application of one way functions and the deletion of each node's DH secret value significantly enhances network security.

It will also be noted that the key management scheme described herein may also be used to provide an integrity-only check for later packets. In this case, the key $K_p$ may be used directly by either node I or node J to encrypt a message digest of the packet header or packet header and data. Alternatively, $K_p$ may be used to compute a Message Authentication Code (MAC) either over the entire packet, or over a message digest computed over the packet.

Improved Application of SKIP to Datagram Multicast Protocols

As disclosed in any co-pending parent application, and incorporated herein by reference, the method of the present invention may be used in conjunction with datagram multicasting protocols such as IP (or IPng) multicast. This application requires key-management awareness in the establishment and joining process of multicast groups. Furthermore, in order to distribute multicast keying material, the notion of a group owner should exist. When secure multicasting to a multicast address M is required, a group membership creation primitive will establish the group key $K_g$ and the membership list of addresses that are allowed to transmit and receive encrypted multicast datagrams to and from group address M. This action will be taken by the group owner.

The group key $K_g$ is not used as a packet encryption key, but rather as the Group Interchange Key (GIK). Namely, $K_g$ is used as a key-encrypting-key, similar to way the pair keys $[K_{ij}]_N$ are used in SKIP for unicast IP.

Nodes wishing to transmit/receive encrypted datagrams to multicast address M acquire the GIK $K_g$. In the present invention, this is accomplished by sending an encrypted/ authenticated request-to-join primitive to the group owner. If the requesting node's address is part of the group's authorized membership list, the group owner sends the GIK $K_g$, algorithm identifier, associated lifetime information and key-change policy in an encrypted packet, using the pairwise secure protocol previously described in this Specification.

The packet formats for the GIK request/response is given below. This describes the payload portion of either a TCP or UDP packet, which has been enhanced using SKIP unicast procedures. If using UDP, multiple requests may be sent, in case of packet losses of earlier requests/response messages. The request is sent to TCP/UDP port #XXXXX corresponding to the group owner's unicast IP address.

```
 0                   1                   2                   3
 0 1 2 3 4 5 6 7 8 9 0 1 2 3 4 5 6 7 8 9 0 1 2 3 4 5 6 7 8 9 0 1
```

| Version = 1 ¦ Reserved |
|---|
| IP Multicast Address M |

The first field specifies the version of this protocol, which is 1. Following this field is the actual IP multicast address for which the GIK is being requested. The request packet that is sent must have the minimal IPSP enhancement of source-origin authentication, and may optionally be encrypted and/or have playback protection by use of the sequence number field. The group owner's response is an encrypted packet containing the GIK $K_g$. The response is sent to TCP/UDP port #XXXXX and is addressed to the requestor's unicast IP address. This packet format is as follows. As before, it defines the data-portion of a TCP or UDP packet.

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
| Version = 1      | Kg alg. id       | Reserved                |
+-+-+-+-+-+-+-+-+-+-+-+-+-+-+-+-+-+-+-+-+-+-+-+-+-+-+-+-+-+-+-+-+
|     IP Multicast Address M                                    |
+-+-+-+-+-+-+-+-+-+-+-+-+-+-+-+-+-+-+-+-+-+-+-+-+-+-+-+-+-+-+-+-+
| Expiry time     (low 32-bits)                                 |
+-+-+-+-+-+-+-+-+-+-+-+-+-+-+-+-+-+-+-+-+-+-+-+-+-+-+-+-+-+-+-+-+
| Expiry time     (high 32-bits)                                |
+-+-+-+-+-+-+-+-+-+-+-+-+-+-+-+-+-+-+-+-+-+-+-+-+-+-+-+-+-+-+-+-+
| Recommended Key Change Interval (in secs)                     |
+-+-+-+-+-+-+-+-+-+-+-+-+-+-+-+-+-+-+-+-+-+-+-+-+-+-+-+-+-+-+-+-+
| Recommended Key Change Interval (in bytes)                    |
+-+-+-+-+-+-+-+-+-+-+-+-+-+-+-+-+-+-+-+-+-+-+-+-+-+-+-+-+-+-+-+-+
|  Kg  ...  (length dependent on Kg alg id)                     |
+-+-+-+-+-+-+-+-+-+-+-+-+-+-+-+-+-+-+-+-+-+-+-+-+-+-+-+-+-+-+-+-+
```

The 64-bit expiry time specifies when the multicast key is considered to have expired. This is in terms of seconds since, Jan. 1, 1994, expressed in GMT. The recommended key-change interval is what every source of encrypted traffic to the multicast group uses to determine the key-change policy. There are two ways currently envisioned to specify a key-change policy. The first is in terms of elapsed time since last key-change. Another is in terms of the amount of data encrypted in a given packet encryption key. It is contemplated that each source will use whichever of these methods which determines the more frequent key-change policy, whether this is in terms of amount of traffic encrypted in a given key, or in terms of elapsed time (in seconds) since the last key change.

Transmitting nodes to group address M will randomly generate packet encryption keys $K_p$, and encrypt these keys using $K_g$. The packet structure is similar to the structure used for encrypted unicast SKIP packets, except that the packet keys $K_p$ are not encrypted in the pair-wise keys $K_{ij}$, but instead are encrypted using the GIK $K_g$. An example encrypted multicast packet is shown below.

In addition, since all the packet encryption keys are randomly generated, and hence different, there is no problem in using stream-ciphers with multicast. This is because each source of encrypted traffic when using a stream cipher would use a different key-stream and thus there is no key-stream reuse problem. If all members of the multicast group used the same packet encryption key, then certain stream ciphers could not be used with multicast IP.

An implementation of this improved protocol will use the destination IP multicast address to look-up the GIK $K_g$.

How the identity of the group owner is established and communicated to the participating nodes is left to the application layer. However, it will be appreciated that this should be done in a secure fashion, otherwise the underlying key-management facility may be defeated.

An advantage of the method of the present invention is that only the keying information is distributed in a pair-wise fashion. The actual encrypted data packet is sent using the standard multicast delivery mechanisms, thereby allowing the same network bandwidth efficiency that is expected of a network layer multicast protocol when operating over sub-

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|    Clear IP Header          IP protocol = IPSP ...            |
+-+-+-+-+-+-+-+-+-+-+-+-+-+-+-+-+-+-+-+-+-+-+-+-+-+-+-+-+-+-+-+-+
| Ver. |1|0|0|0|0|0|          SAID                              |
+-+-+-+-+-+-+-+-+-+-+-+-+-+-+-+-+-+-+-+-+-+-+-+-+-+-+-+-+-+-+-+-+
|    Reserved.    |  Kp alg   | reserved                        |
+-+-+-+-+-+-+-+-+-+-+-+-+-+-+-+-+-+-+-+-+-+-+-+-+-+-+-+-+-+-+-+-+
|    Kp encrypted in Kg ...         (typically 8-16 bytes)
+-+-+-+-+-+-+-+-+-+-+-+-+
|    Message Indicator (e.g. IV) ...   (typically 8 bytes)
+-+-+-+-+-+-+-+-+-+-+-+-+
|    Begin Protected IPSP Payload ...
+-+-+-+-+-+-+-+-+-+-+-+-+
```

The destination IP address will be used by the receiver to determine whether to use unicast of multicast key-processing procedures on a received IP packet. In case the destination address is an IP multicast address, it will use the group IK $K_g$ to decrypt the packet encryption key $K_p$.

There are two distinct advantages of this scheme. Every member of the multicast group can change packet encryption keys as often as required (in line with the policy set by the group owner), without involving key-setup communications overhead involving every member of the group. This can be extremely frequent, even once every few seconds, even with very large multicast groups, because there is no extra communications overhead for changing packet encryption keys.

networks which also support multicasting (for example, Ethernet, FDDI, etc). This scheme is considered to scale well, even for a large number of nodes, because key-change requires no extra communications overhead.

Management of DH Certificates

Since the nodes' public DH values are communicated in the form of certificates, the same type of multi-tier certification structure that is being deployed for PEM, and also by the European PASSWORD. There may be a Top Level Certifying Authority (TLCA) which may constitute the same the Internet Policy Registration Authority (IPRA), Policy Certifying Authorities (PCAs) at the second tier and the organizational Certificate Authorities (CAs) below that.

In addition to the identity certificates, which are part of PEM, additional authorization certificates are needed to properly track the ownership of IP addresses. Since it is desirable to directly use IP addresses in the DH certificates, name subordination principles alone cannot be used to determine if a particular CA has the authority to bind a particular IP address to a DH public key. However, the present invention may use the X.509/PEM certificate format, since the subject Distinguished Name (DN) in the certificate can be the ASCII decimal representation of an IP (or IPng) address.

Since the nodes only have DH public keys, which have no signature capability, the nodes themselves are unable to issue DH certificates. The node certificates are issued by organizational CAs which have jurisdiction over the range of IP addresses that are being certified. The PCAs will have to perform suitable checks (in line with the policy of that PCA), to confirm that the organization which has jurisdiction over a range of addresses is issued a certificate giving it the authority to certify the DH values of individual nodes with those addresses. This authority may be delegated in the form of a authorization certificate signed by the PCA. For the purposes of authorization, the CA's Distinguished Name (DN) will be bound to the range of IP addresses over which it has jurisdiction. The CA has either an RSA or DSA certificate from the PCA. The CA which has authority over a range of IP addresses can delegate authority over part of the range to a subordinate CA, by signing another authorization certificate using its own private key. The organizational CA so authorized is identified by the range of IP addresses that it can issue certificates for. The range of IP addresses are identified in the certificate in the form of a IP address prefix length list.

I claim:

1. A method for a first data processing device (node I) to send data to a second data processing device (node J), comprising the steps of:
   providing a secret value i and a first public value to said node I;
   providing a context variable $N_i$ to said node I;
   providing a secret value j, and a second public value to said node J;
   said node I performing the steps of:
      obtaining a certificate for node J and determining said second public value for node J from said certificate for node J;
      computing a key $\{K_{ij}\}_{N_i}$ from a shared secret derived from said second public value, said secret value i, and said context variable $N_i$;
      utilizing said key $\{K_{ij}\}_{N_i}$ to encrypt a randomly generated transient key $K_p$, and encrypting a data packet to be transmitted to node J using said key $K_p$;
   said node I sending said data packet encrypted using said key $K_p$ to said node J;
   said node I notifying said node J of the current value of $N_i$.

2. The method as defined by claim 1, further comprising the steps of:
   providing a context variable $N_j$ to said node J;
   said node J performing the steps of:
      receiving said encrypted data packet from node I;
      obtaining a certificate for said node I and determining said first public value for node I from said certificate for node I;
      comparing said context variable $N_j$ to said context variable $N_i$;
      if $N_i > N_j$, computing said key $\{K_{ij}\}_{N_i}$ from a shared secret derived from said first public value, said secret value j, and said context variable $N_i$; and
      if $N_i > N_j$ and said encrypted packet is valid, setting said context variable $N_j$ to equal $N_i$.

3. The method as defined by claim 2, further including the steps by node J of:
   utilizing said key $\{K_{ij}\}_{N_i}$ to decrypt said transient key $K_p$, and
   decrypting said encrypted data packet using said transient key $K_p$, whereby node J decrypts data received from and previously encrypted by node I.

4. The method as defined by claim 3 further including the steps by node J of:
   computing a key $\{K_{ij}\}_{N_j}$ from a shared secret derived from said first public value,
      said secret value j, and said context variable $N_j$; and if $N_i = N_j$,
   utilizing said key $\{K_{ij}\}_{N_j}$ to decrypt said transient key $K_p$, and
   decrypting said encrypted data packet using said transient key $K_p$; whereby node J decrypts data received from and previously encrypted by node I.

5. The method as defined by claim 3 further including the steps by node J of discarding said encrypted data packet and signaling an error condition if $N_i < N_j$.

6. The method as defined by claim 3, wherein said nodes I and J increment said $N_i$ and $N_j$, respectively after a predetermined time period.

7. The method as defined by claim 6, wherein said data packet includes a context field including said context variable $N_i$.

8. The method as defined by claim 6, wherein said first public value is $\alpha^i \bmod p$.

9. The method as defined by claim 8, wherein said second public value is $\alpha^j \bmod p$.

10. The method as defined by claim 9, wherein $N_i$ and $N_j$ are initially set equal to 1.

11. The method as defined by claim 6, wherein said first public value is $\alpha^{(\alpha^{MN_i})i} \bmod p$ for some integer M.

12. The method as defined by claim 11, wherein said second public value is $\alpha^{(\alpha^{MN_j})j} \bmod p$ for some integer M.

13. The method as defined by claim 12, wherein M=2 and $N_i$ and $N_j$ are initially set equal to 0.

14. The method as defined by claim 6, wherein said key $\{K_{ij}\}_{N_i}$ is used as a key for a shared key cryptosystem (SKCS).

15. The method as defined by claim 14, wherein said SKCS is DES.

16. The method as defined by claim 14, wherein said SKCS is RC2.

17. The method as defined by claim 14, wherein said data packet includes a source address, a destination address and an SKCS identifier field.

18. The method as defined by claim 17, wherein said data packet further includes a message indicator field.

19. The method as defined by claim 6, wherein $\alpha$ and p are system parameters, and where p is a prime number.

20. An apparatus for encrypting data for transmission from a first data processing device (node I) to a second data processing device (node J), comprising:
   node I including a first storage device configured to store a secret value i, a first public value, and an internal context variable $N_i$;
   node J including a second storage device configured to store a secret value j, a second public value, and an internal context variable $N_j$;

node I including an encrypting device configured to encrypt a data packet to be transmitted to node J, said data packet being encrypted using a first certificate for node J to determine said second public value for node J;

said encrypting device further deriving a key $\{K_{ij}\}_{N_i}$ from the value of a shared secret derived from said second public value, said secret value i, and said context variable $N_i$, and said encrypting device encrypting a randomly generated transient key $K_p$ using $\{K_{ij}\}_{N_i}$, and encrypting said data packet using said transient key $K_p$;

node I further including an interface circuit configured to transmit said encrypted data packet to said node J and to notify said node J of the value of $N_i$.

21. The apparatus as defined by claim 20, wherein said node J further includes:

a receiver configured to receive said encrypted data packet from node I;

a decrypting device coupled to said receiver configured to decrypt said data packet from node I.

22. The apparatus as defined by claim 21, wherein said decrypting device obtains a second certificate for said node I, determines said first public value for node I, and computes a shared value secret derived from said first public value and said secret value j.

23. The apparatus as defined by claim 22, wherein said decrypting device compares said internal context variable $N_j$ with said context variable $N_i$.

24. The apparatus as defined by claim 23, wherein if $N_i > N_j$, said node J computes said key $\{K_{ij}\}_{N_i}$ from a shared secret derived from said first public value, said secret value j, and said context variable $N_i$;

said encrypting device utilizing said key $\{K_{ij}\}_{N_i}$ to decrypt said transient key $K_p$, and decrypting said received data packet using said transient key $K_p$, and setting $N_j$ equal to $N_i$ if said data packet is valid.

25. The apparatus as defined by claim 24, wherein said node J computes said key $\{K_{ij}\}_{N_i}$ from a shared secret derived from said first public value, said secret value j, and said context variable $N_i$, and if $N_i = N_j$, said encrypting device utilizes said key $\{K_{ij}\}_{N_i}$ to decrypt said transient key $K_p$ and decrypts said received data packet using said transient key $K_p$.

26. The apparatus as defined by claim 25, wherein if $N_i < N_j$, said node J discards said data packet.

27. The apparatus as defined by claim 26, wherein said nodes I and J increment said $N_i$ and $N_j$, respectively after a predetermined time period.

28. The apparatus as defined by claim 27, wherein said data packet includes a context field storing said value of $N_i$ to notify said node J of said value of $N_i$.

29. The apparatus as defined by claim 28 wherein said first public value is $\alpha^{N_i}$ mod p.

30. The apparatus as defined by claim 29, wherein said second public value is $\alpha^{N_j}$ mod p.

31. The apparatus as defined by claim 30, wherein $N_i$ and $N_j$ are initially set equal to 1.

32. The apparatus as defined by claim 31, wherein said first public value is $\alpha^{(M^{N_i})i}$ mod p.

33. The apparatus as defined by claim 32, wherein said second public value is $\alpha^{(M^{N_j})j}$ mod p.

34. The apparatus as defined by claim 33, wherein M=2.

35. The apparatus as defined by claim 34, wherein said key $\{K_{ij}\}_{N_i}$ is used as a key for a shared key cryptosystem (SKCS) and is derived from $\alpha^{(M^{N_i})ij}$.

36. The apparatus as defined by claim 35, wherein said data packet includes a source address, a destination address and an SKCS identifier field.

37. The apparatus as defined by claim 36, wherein said data packet further includes a message indicator field.

38. The apparatus as defined by claim 37, wherein $\alpha$ and p are system parameters, and where p is a prime number.

39. The apparatus as defined by claim 38, wherein said SKCS is DES.

40. The apparatus as defined by claim 38, where said SKCS is RC2.

* * * * *